(12) United States Patent
Hall et al.

(10) Patent No.: US 7,583,522 B2
(45) Date of Patent: Sep. 1, 2009

(54) LOW AUDIBLE NOISE POWER SUPPLY METHOD AND CONTROLLER THEREFOR

(75) Inventors: Jefferson W. Hall, Chandler, AZ (US); Christophe Basso, Pibrac (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 313 days.

(21) Appl. No.: 10/546,491

(22) PCT Filed: Feb. 17, 2004

(86) PCT No.: PCT/US2004/004520
§ 371 (c)(1),
(2), (4) Date: Aug. 22, 2005

(87) PCT Pub. No.: WO2005/086334
PCT Pub. Date: Sep. 15, 2005

(65) Prior Publication Data
US 2006/0171179 A1  Aug. 3, 2006

(51) Int. Cl.
*H02M 3/24* (2006.01)

(52) U.S. Cl. .................................... 363/95; 363/21.17
(58) Field of Classification Search .................. 363/95, 363/282, 20, 21.04, 21.07, 21.1, 21.12, 21.18, 363/21.17, 41
See application file for complete search history.

(56) References Cited

U.S. PATENT DOCUMENTS

| | | | |
|---|---|---|---|
| 6,252,783 B1 | 6/2001 | Huh et al. | |
| 6,667,605 B2 | 12/2003 | Balakrishnan et al. | |
| 7,167,382 B2* | 1/2007 | Hachiya | 363/24 |
| 2003/0107356 A1* | 6/2003 | Hachiya | 323/282 |
| 2003/0197494 A1* | 10/2003 | Kanouda et al. | 323/287 |
| 2004/0125620 A1* | 7/2004 | Yamashita | 363/21.01 |

OTHER PUBLICATIONS

Data Sheet, 'NCP1200A PWM Current-Mode Controller for Universal Off-Line Supplies Featuring Low Standby Power', Semiconductor Components Industries, LLC, Jan. 2003—Rev. 4.

* cited by examiner

*Primary Examiner*—Adolf Berhane
*Assistant Examiner*—Nguyen Tran
(74) *Attorney, Agent, or Firm*—Robert F. Hightower

(57) ABSTRACT

A power controller forms drive pulses that reduces audible noise under light load conditions.

20 Claims, 5 Drawing Sheets

LOW AUDIBLE NOISE POWER SUPPLY METHOD AND CONTROLLER THEREFOR

BACKGROUND OF THE INVENTION

The present invention relates, in general, to electronics, and more particularly, to methods of forming semiconductor devices and structure.

In the past, the semiconductor industry utilized various methods and circuits to implement switching power supply systems and controllers. In order to minimize power dissipation, some implementations would switch the power transistor at a lower frequency or may even switch the power transistor on and off in short bursts. One such implementation to minimize power dissipation was disclosed in U.S. Pat. No. 6,252,783 issued to Dong-Young et al on Jun. 26, 2001.

One problem with such implementations was audible noise typically in the frequency range of about twenty to twenty thousand (20-20,000) Hz. When the switching frequency of the power transistor was reduced, it often produced noise in the audible frequency range. The audible noise was often objectionable and became a nuisance to users of the power supply.

Accordingly, it is desirable to have a switching power supply that has reduced power dissipation, and that minimizes audible noise.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
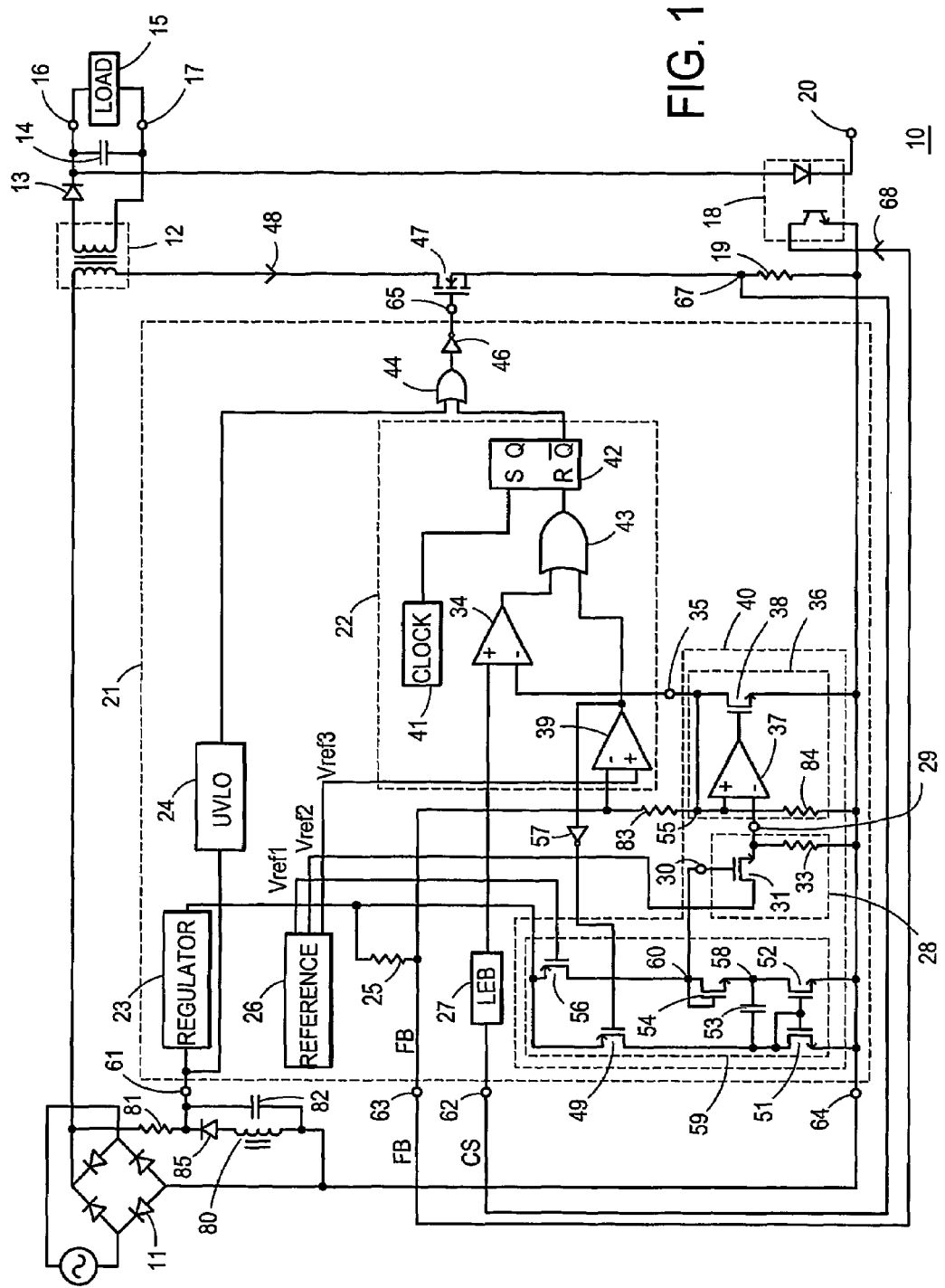
FIG. 1 schematically illustrates a portion of an embodiment of a power supply system having a power supply controller in accordance with the present invention.

FIG. 1 schematically illustrates an embodiment of a portion of a power supply system 10 that includes a power supply controller 21 which minimizes audible noise during the operation of both controller 21 and system 10. Other components typically are connected externally to controller 21 in order to provide functionality for system 10. For example, a bridge rectifier 11 which receives a source voltage from an ac source such as a household mains, a transformer 12, a blocking diode 13, an energy storage capacitor 14, an output transistor 47, a feedback network 18, and a current sense resistor 19 typically are connected externally to controller 21. Transistor 47 typically is a switching power transistor that is connected in series between one leg of the primary of transformer 12 and resistor 19, although in some embodiments transistor 47 and resistor 19 may be included within controller 21. Transformer 12 typically includes a secondary winding 80 that along with a bias resistor 81, a blocking diode 85, and a storage capacitor 82 are used to provide power for operating controller 21. Controller 21 receives the power between a voltage input 61 and a voltage return 64, and system 10 provides an output voltage between output terminals or outputs 16 and 17. A load 15 typically is connected between outputs 16 and 17 to receive a load current from system 10 in addition to the output voltage.

Controller 21 has an output 65 that is connected to drive transistor 47. Current sense resistor 19 is connected in series between transistor 47 and return 64 to provide a current sense (CS) signal at a node 67 that is a voltage which is representative of a switch current 48 that flows through transistor 47. The current sense (CS) signal is received by controller 21 on a current sense (CS) input 62. Feedback network 18 typically is an optical coupler that provides a current 68 that is representative of the output voltage between outputs 16 and 17. The optical coupler typically has a light emitting diode connected between output 16 and a connection 20 to a reference voltage, and an optical transistor having a collector connected to a feedback (FB) input 63 of controller 21 and an emitter connected to return 64. Reference voltage received at connection 20 is chosen so the value of the reference voltage and the voltage drop across the diode of network 18 approximately equals the nominal value of the output voltage between outputs 16 and 17. For example, the reference voltage could be a zener diode connected between output 17 and connection 20. Current 68 is received by controller 21 and is converted to a FB voltage at input 63 by a resistor 25. The optical coupler of network 18 and resistor 25 invert the operation of the FB voltage so that the FB voltage increases as the output voltage decreases and vice versa. Feedback network 18 may also be any one of a variety of well known feedback circuits including series connected resistors. Transformer 12, capacitor 14, diode 13, and network 18 are shown to assist in describing the operation of controller 21. In most embodiments, network 18, transistor 47, transformer 12, capacitor 14, and diode 13 are external to the semiconductor die on which controller 21 is formed.

Controller 21 includes a pulse width modulated (PWM) controller or PWM 22, a reference generator or reference 26, a signal envelope control block 40, and an internal regulator 23. Controller 21 also may include other circuits to provide additional functionality to controller 21 such as an under voltage lock-out (UVLO) circuit 24, a leading edge blanking circuit (LEB) 27, a UVLO control logic OR gate 44, and a transistor driver 46. Other well-known functions such as soft-start and over-voltage protection may also be included within controller 21. Regulator 23 provides an operating voltage for the elements within controller 21 including PWM 22, block 40, UVLO circuit 24, and LEB 27. Although not shown for simplicity of the drawings, regulator 23 is connected between input 61 and return 64 to receive the input voltage applied to input 61. PWM 22 includes a clock generator or clock 41 that provides clock signals at a periodic rate, a reset dominate RS latch 42, a burst-mode comparator 39, a PWM comparator 34, and a logic control OR gate 43.

Controller 21 is formed to operate in at least two different stable regulated modes referred to herein as a normal-mode and a burst-mode, and to transition between these two modes in response to load current changes. The output of comparator 39 is used to switch controller 21 between the normal and burst operating modes responsively to the FB voltage changing from a first value to a second value. In the normal-mode, controller 21 regulates the output voltage to a desired output voltage value while supplying a normal average load current to load 15. To facilitate this, PWM 22 provides periodic drive pulses to transistor 47. PWM 22 controls the duration or width of the drive pulses and correspondingly the duration and the amplitude of switch current 48 responsively to the value of the FB voltage and the CS signal. Under light load conditions the load current required by load 15 may decrease. In such a case, it may be desirable to reduce the number of drive pulses to transistor 47 in order to improve the efficiency of system 10. Controller 21 is formed to detect such a light load condition and change the operating mode of controller 21 to the burst-mode. In the burst-mode, controller 21 reduces the average value of the load current supplied to load 15 in response to the decreased load current required by load 15 but continues regulating the output voltage to the desired output voltage value. In the burst-mode, controller 21 provides sets of drive pulses to transistor 47 and controls the width of the drive pulses within each set to form an asymmetric signal envelope for each of the corresponding sets of pulses of switch current 48 in order to reduce audible noise.

Figure 2:
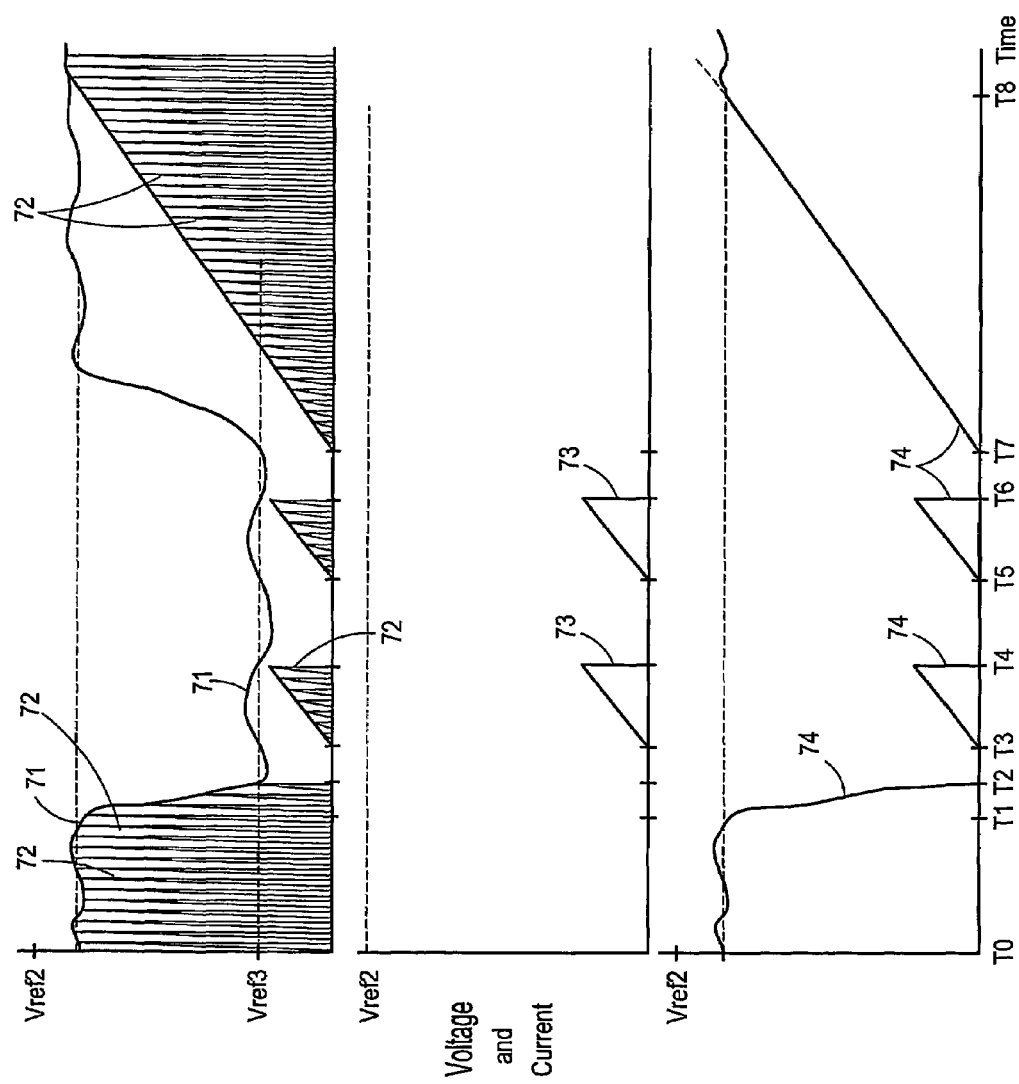
FIG. 2 is a graph illustrating timing diagrams for a portion of the signals and operation sequence of the power supply controller of FIG. 1 in accordance with the present invention.

FIG. 2 is a graph having plots that illustrate some signals generated during the operation of controller 21. The abscissa indicates time and the ordinate represents the value of either current or voltage. A plot 71 represents the value of a shifted FB voltage as is explained further hereinafter and a plot 72 represents switch current 48 flowing through transistor 47 in response to drive pulses that are generated at output 65 of controller 21. A plot 73 represents the signal envelope of switch current 48 that is generated when PWM 22 is operating in the burst-mode. A plot 74 represents the value of a FB reference voltage received on an inverting input of comparator 34. Between time T0 and T1, controller 21 is regulating in the normal-mode. The time between T1 and T2 is a transition time when controller 21 is switching from the normal-mode to the burst-mode in response to a load current change. Between time T2 and T7, controller 21 is regulating in the burst mode. During times T2 to T3, T4 to T5, and T6 to T7 controller 21 is skipping pulses in the burst mode. Between time T7 and T8 controller 21 is in transition between regulating in the burst-mode and regulating in the normal-mode in response to a load current change. After time T8, controller 21 is regulating in the normal-mode. Note that plot 73 illustrates the signal envelope during the burst-mode, thus, there is not a waveshape between times T0-T1 and T7-T8.

This description has references to both FIG. 1 and FIG. 2. The exemplary embodiment illustrated in FIG. 1 and particularly the embodiment of block 40 is used for the description of the operation of controller 21, however, other embodiments may use different implementations to achieve the desired asymmetrical signal envelope of switch current 48 during the burst-mode of operation as is described hereinafter. Block 40 includes an envelope generator 59, a clamp reference 28, and a shunt regulator clamp 36. Envelope generator 59 is formed to generate an envelope signal on an output 60. The envelope signal is used to control the waveshape or signal envelope of switch current 48 when controller 21 is operating in the burst-mode. In the preferred embodiment, generator 59 includes a bias transistor 56, an output transistor 54, a timing capacitor 53, a control transistor 49, and current mirror transistors 51 and 52 connected in a current mirror configuration. Clamp reference 28 preferably includes a follower transistor 31 and a pull-down resistor 33. Shunt regulator clamp 36 preferably includes an amplifier 37 and a transistor 38 connected in a shunt regulator configuration. Other circuit configurations can be used to implement block 40 as long as the embodiments achieve an asymmetric signal envelope of switch current 48 during the burst-mode of operation.

Reference 26 provides three reference voltages, Vref1 through Vref3, on three separate outputs that are used in the operation of controller 21. Vref1 is a bias voltage that is received by generator 59 to provide bias currents within generator 59 and may also be used to provide other bias currents that are not shown for simplicity of the drawing. Vref3 is received by comparator 39 and is used to set a threshold voltage at which controller 21 begins operating in the burst-mode as will be seen further hereinafter. Vref2 is used by reference 28 to set a maximum value of the signal envelope as will be seen further hereinafter. Typically, Vref2 has a higher voltage value than Vref3.

During operation in the normal-mode, the output voltage between outputs 16 and 17 is close to a first value or desired operating output voltage value. The value of the resulting FB voltage received on input 63 is shifted through resistors 83 and 84 to generate the shifted FB voltage. The desired value of the output voltage is established by the shifted FB voltage and the CS signal. The desired value of the shifted FB voltage for a normal load current to load 15 typically is between Vref2 and Vref3. Since the FB voltage is greater than Vref3, the output of comparator 39 is low. The low output of comparator 39 is received by gate 43 and allows the output of PWM comparator 34 to control latch 42 through gate 43. The low output of comparator 39 also enables envelope generator 59 by disabling transistor 49 through inverter 57. Thus, the envelope signal on output 60 is high. The high envelope signal is received on a control input 30 of reference 28 and correspondingly enables transistor 31. Reference 28 responsively couples Vref2 to an output 29 of reference 28 to generate an envelope control signal on output 29 that is approximately equal to Vref2. Clamp 36 receives both the envelope control signal from reference 28 and the shifted FB voltage and responsively generates the FB reference voltage on output 35. Since amplifier 37 and transistor 38 are connected as a shunt regulator, as long as the envelope control signal is greater than the shifted FB voltage, clamp 36 forms the FB reference voltage to be approximately equal to the shifted FB voltage, thus, the FB reference voltage on an output 35 is approximately equal to the shifted FB voltage as illustrated by plot 74 between time T0 and T2. In the event of a short circuit or other failure on output 16, clamp 36 ensures that the value of the FB reference voltage is never greater than Vref2, thereby limiting peak switch current, in order to prevent damaging system 10.

Clock 41 provides clock pulses that set latch 42 and enable or turn-on transistor 47 through driver 46 causing current 48 to flow through transistor 47 and generate the CS signal. When the value of the CS signal on input 62 increases to a value equal to the FB reference voltage on output 35, the output of PWM comparator 34 goes high to reset latch 42 and turn-off or disable transistor 47. This is illustrated by plot 72 between time T0 and T2. Each pulse of current 48 in plot 72 between time T0 and T2 begins when clock 41 sets latch 42. The width of each drive pulse to transistor 47, thus the width and the resulting amplitude of each pulse of switch current 48, is set by the value of the FB reference voltage and the CS signal. The greater the width of the drive pulse on output 65, the greater the amplitude and the width of both switch current 48 and the load current to the combination of load 15 and capacitor 14.

When a light load condition occurs, the amount of load current used by load 15 decreases. Due to the time delay through system 10, PWM 22 temporarily continues to supply a larger load current causing a corresponding increase in the output voltage on output 16 from the first value or desired value to a second value resulting in an increase in current 68 and a corresponding decrease in the FB voltage at input 63. When the FB voltage decreases to the threshold value of comparator 39 or a second voltage value, the output of comparator 39 is driven high indicating the beginning of operation in the burst-mode. The shifted FB voltage typically decreases to a threshold value that is no greater than Vref3 as illustrated by plot 71 at time T2. In the burst-mode, PWM 22 groups drive pulses to transistor 47 and the corresponding pulses of current 48 into sets with each set of pulses of current 48 having an asymmetric signal envelope. The shape of the signal envelope and the amplitude of the pulses of current 48 within each set are controlled by the shape of the envelope signal formed by generator 59. In the preferred embodiment, generator 59 generates a ramp or slope or triangular shaped asymmetrical waveshape that increases over time from an initial value to a greater value and then rapidly decreases back to the initial value. Thus, PWM 22 is coupled to receive the asymmetrical reference voltage from block 40 and responsively generate a set of drive pulses having widths suitable for forming a set of pulses of current 48 that have an asymmetrical signal envelope. Clamp reference 28 is formed to receive the asymmetric waveshape of the envelope signal and responsively generate an envelope control signal on output 29 that follows the waveshape of the envelope signal from generator 59. Clamp 36 receives the envelope control signal and the shifted FB voltage and responsively generates a FB reference voltage on output 35 that has the same waveshape as the envelope signal formed by generator 59. This triangular or ramp shaped asymmetrical waveform is used to control the width of the drive pulses on output 65 and the corresponding signal envelope, width, and amplitude of the pulses of current 48. The specific implementation of generator 59 illustrated in FIG. 1 is one example of a circuit capable of generating the preferred asymmetrical signal envelope of current 48. However, it should be noted that other circuits may be utilized to form the preferred signal envelope and that other asymmetrical shaped signal envelopes may be utilized. The asymmetric waveshape facilitates reducing audible noise during the burst-mode operation. Each pulse of current 48 within each set of current pulses starts when latch 42 is set by clock 41 and ends when the value of the CS signal and the FB reference voltage cause the output of comparator 34 to go high.

For the example embodiment illustrated in FIG. 1 and FIG. 2, at time T2 the FB voltage reduces to a value less than Vref3 and drives the output of comparator 39 high. The output of comparator 39 resets latch 42 through gate 43 to terminate drive pulses on output 65. The high also enables transistor 49 through inverter 57 causing current to flow through transistor 49 and pull node 58 low. Output 60 is thereby driven to the gate-to-source voltage of transistor 54. The source voltage of follower transistor 31 of reference 28 and output 29 follows the source voltage of transistor 54 and is pulled low through resistor 33. The low on output 29 forces the FB reference voltage on output 35 low. When the FB voltage increases to a value equal to or greater than Vref3 as illustrated at time T3, the output of comparator 39 goes low. The low allows comparator 34 to control gate 43 and latch 42, and also turns-off transistor 49 of generator 59 to begin charging capacitor 53. As capacitor 53 charges, output 60 increases from a low value approximately equal to return 64 plus the Vgs of transistor 54 toward the value of Vref2. The Vgs of transistor 54 shifts the level of the envelope signal on output 60 to compensate for the Vgs drop of follower transistor 31. Therefore, the voltage on output 29 is approximately equal to the voltage on node 58.

The output 29 increases from a low value approximately equal to return 64 toward the value of Vref2. Since amplifier 37 and transistor 38 are connected as a shunt regulator and the envelope control signal is less than the shifted FB voltage, the FB reference voltage on output 35 correspondingly increases from a low value approximately equal to return 64 toward the value of Vref2 as illustrated by plot 74 between time T3 and T4. Thus, the FB reference voltage on output 35 follows the waveshape of the envelope signal on output 60.

Each clock pulse of clock 41 sets latch 42 thereby enabling transistor 47 and causing a pulse of current 48 unless latch 42 is held reset by gate 43. The corresponding CS signal from node 67 is received by comparator 34. When the value of the CS signal increases to the value of the FB reference voltage on output 35, the output of comparator 34 goes high resetting latch 42. The FB reference voltage continues to increase, thus, the next clock pulse from clock 41 generates another pulse of current 48 that has a longer duration due to the increased value of the FB reference voltage. As the FB reference voltage increases, each successive pulse of current 48 flows for a longer period of time thereby achieving a greater amplitude according to the equation $(V/L)=(dI/dT)$, where V is the voltage across the primary inductance of transformer 12, L is the value of the primary inductance, dI is the peak-to-peak charge in primary current 48, and dT is the change in time, as illustrated by the pulses of current 48 within the set of pulses illustrated by plot 72 between time T3 and T4. At time T4, the FB voltage decreases to a value less than Vref3 and the output of comparator 39 again goes low. The low output of comparator 39 resets latch 42 through gate 43 and terminates the pulse of current 48. The low output of comparator 39 also enables transistor 49 which drives node 58 low. Resistor 33 responsively pulls output 29 low as the source of follower transistor 31 follows node 58 causing output 35 to also go low and drive the output of comparator 34 high ensuring that transistor 47 is disabled. Consequently, it can be seen that during the burst-mode the waveshape of the envelope signal from generator 59, thus the amplitude and waveshape of the FB reference voltage on output 35, controls the amplitude of each pulse of current 48 as illustrated by plot 72 between T3 and T4. As the amplitude of the envelope signal on output 60 increases, the amplitude of each successive pulse of current 48 also increases. Thus, the amplitude of the pulses of current 48 and the resulting shape of the signal envelope is controlled by the amplitude and shape of the asymmetrical FB reference voltage.

The sequence repeats each time that the FB voltage increases to the threshold value of comparator 39 causing controller 21 to generate another set of pulses of current 48 as illustrated between time T5 and T6. Typically, the sets are spaced apart at least a time period approximately equal to the period of one pulse of clock 41.

If load 15 begins requiring more power, the output voltage decreases causing a corresponding increase in the FB voltage. The increasing FB voltage keeps the output of comparator 39 low allowing output 60 of generator 59 to increase in value as capacitor 53 charges toward the operating voltage from regulator 23. The FB reference voltage on output 35 correspondingly increases toward Vref2 until reaching the value of the shifted FB voltage as illustrated by plot 74 after time T7. As long as the FB voltage remains greater than Vref3, the output of comparator 39 remains low and the FB reference voltage continues to increase until the envelope control signal on output 29 is greater than the shifted FB voltage. At that time, the FB reference voltage begins following the shifted FB voltage. If the value of the shifted FB voltage were greater than Vref2, for example a short circuit occurred between outputs 16 and 17, clamp 36 would clamp the value of the FB reference voltage to Vref2. A dashed line extension illustrates the continued charging of capacitor 53 and output 60.

In order to facilitate this functionality of controller 21, a gate of transistor 56 is connected to the Vref1 output of reference 26, a source of transistor 56 is connected to the output of regulator 23, and a drain is commonly connected to output 60 and the drain and gate of transistor 54. The source of transistor 54 is commonly connected to the drain of transistor 52 and a first terminal of capacitor 53. A second terminal of capacitor 53 is commonly connected to the drain and gate of transistor 51 and the gate of transistor 52. The sources of transistors 51 and 52 are commonly connected to return 64. Transistor 49 has a source connected to the source of transistor 56, a drain connected to the second terminal of capacitor 53, and a gate connected to an output of an inverter 57. An input of inverter 57 is commonly connected to the output of comparator 39 and a first input of gate 43. A non-inverting input of comparator 39 is connected to the Vref3 output of reference 26. An inverting input of comparator 39 is connected to input 63, a first terminal of resistor 25, and a first terminal of resistor 83. A second terminal of resistor 25 is commonly connected to the output of regulator 23. A second terminal of resistor 83 is commonly connected to a non-inverting input of amplifier 37, a first terminal of resistor 84, and a drain of transistor 38. A second terminal of resistor 84 and the source of transistor 38 are commonly connected to return 64. An output of amplifier 37 is connected to the gate of transistor 38. A drain of transistor 38 is connected to output 35 and to an inverting input of comparator 34. An inverting input of amplifier 37 is commonly connected to a first terminal of resistor 33 and a source of transistor 31. A second terminal of resistor 33 is connected to return 64. A drain of transistor 31 is connected to the Vref2 output of reference 26, and a gate is connected to an input 30 and to output 60. A non-inverting input of comparator 34 is connected to receive the CS signal from input 62 through LEB 27. An output of comparator 34 is connected to a second input of gate 43, and an output of gate 43 is connected to the reset input of latch 42. A set input of latch 42 is connected to the output of clock 41 and the inverting output of latch 42 is connected to an input of driver 46 through Gate 44. An output of driver 46 is connected to output 65. In some embodiments, output 65 is connected to a gate of transistor 47. In some embodiments, generator 59 may be a portion of a soft-start circuit of controller 21.

Figure 3:
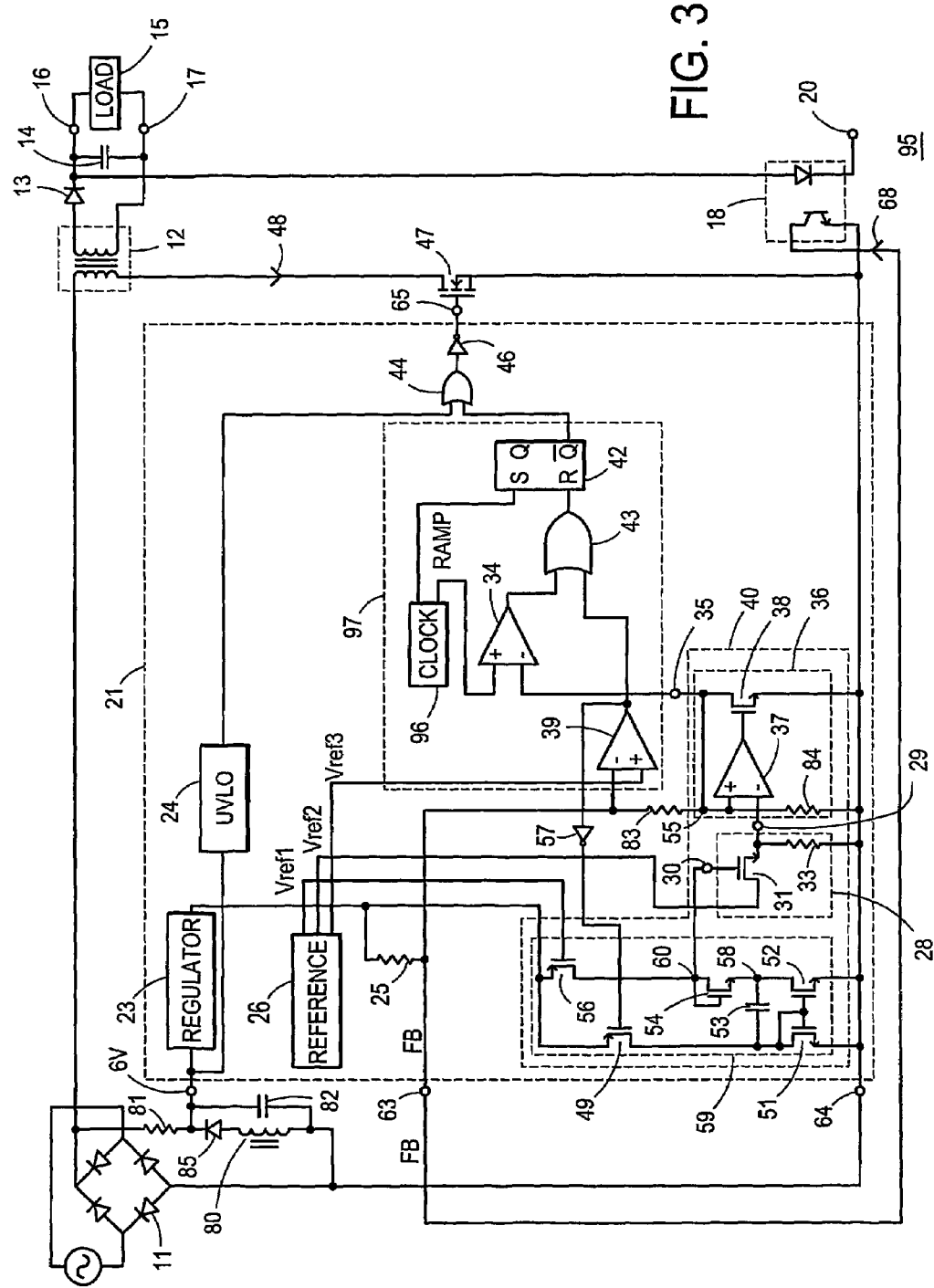
FIG. 3 schematically illustrates a portion of another embodiment of a power supply system having a power supply controller in accordance with the present invention.

FIG. 3 schematically illustrates an embodiment of a portion of a power supply system 95 that is an alternate embodiment of system 10 illustrated in FIG. 1. System 95 includes a PWM controller or PWM 97 that operates controller 21 as a voltage mode controller. PWM 97 includes a clock 96 that provides a ramp signal in addition to the clock signal provided by clock 96. In the normal-mode of operation, the ramp signal is used by PWM 97 to provide the PWM voltage mode regulation. Such voltage mode regulation is well known in the art. In the burst-mode, the FB reference voltage controls the signal envelope of current 48.

Figure 4:
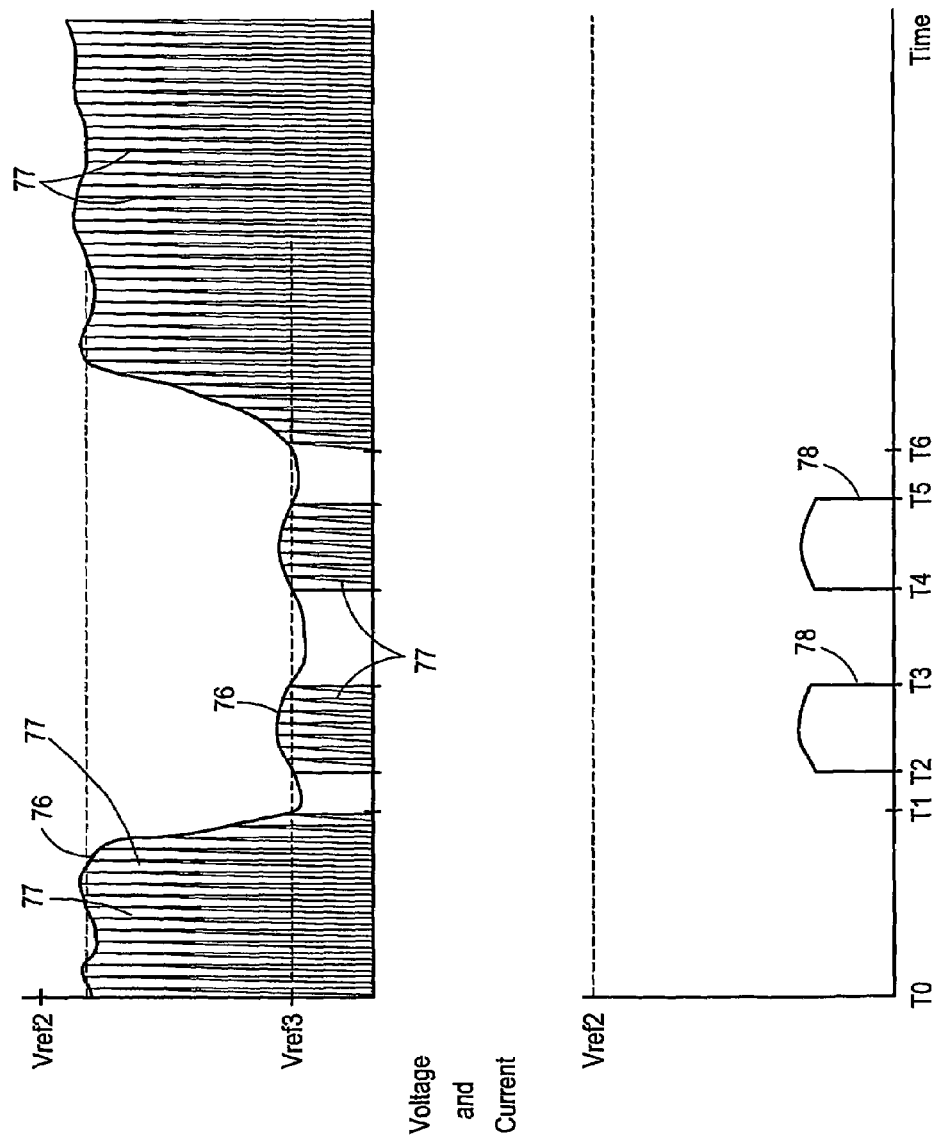
FIG. 4 is a graph illustrating timing diagrams for some signals present in prior power supply controllers.

FIG. 4 is a graph having plots that illustrate some of the signals generated during the operation of a typical prior controller. The abscissa indicates time and the ordinate represents values. A plot 76 represents the value of the feedback voltage and a plot 77 represents switch current pulses that are generated in response to the corresponding feedback voltage. A plot 78 represents the signal envelope of the switch current pulses that are generated in a skip cycle mode. As can be seen between times T2 and T3, the prior controller generates a number of switch current pulses having an amplitude controlled by the FB voltage amplitude and then skips cycles until a time T4 when the output voltage again decreases and another set of switch current pulses are required. This operation continues and repeats as long as the feedback voltage is below the threshold voltage. Plot 78 indicates the shape of the signal envelope that is generated by each set of pulses that are generated in the skip cycle mode. It is easily seen that the signal envelope generated by the sets of drive pulses has a shape that has vertical or square edges and is approximately symmetrical about the midpoint for the examples shown in FIG. 4, and is nearly a rectangular wave shape.

It can be shown by mathematical analysis through a Fourier transform that the rectangular shape of the symmetrical signal envelope shown by plot 78 in FIG. 4 produces signals in the audio range that have a larger amplitude than the audio range signals produced by the asymmetrical signal envelope produced by controller 21. Additionally, the mathematical analysis also shows that the rectangular shape of the symmetrical signal envelope shown by plot 78 in FIG. 4 produces higher frequency harmonics than the asymmetrical signal envelope produced by controller 21. Reducing the higher frequency harmonics results in simpler and lower-cost filtering thereby reducing the system cost.

Figure 5:
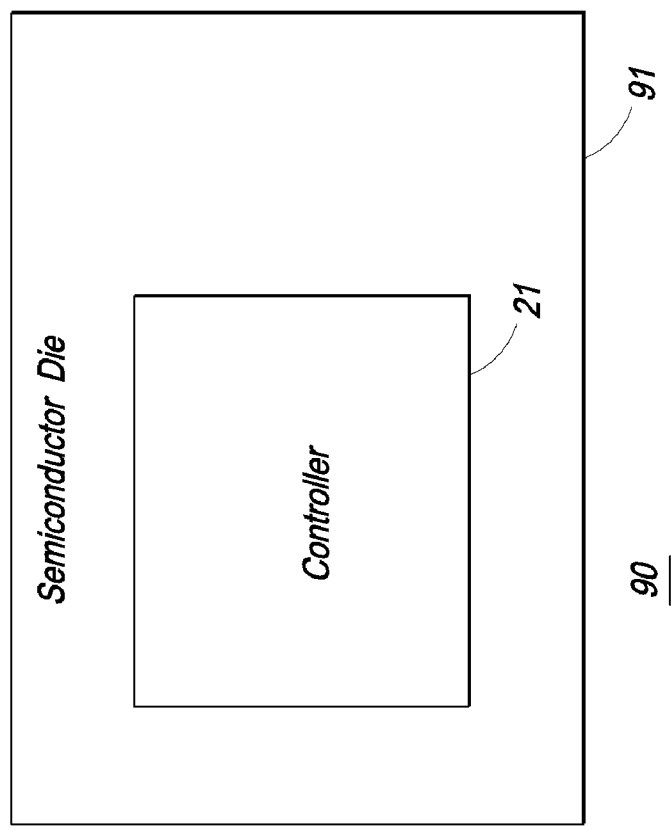
FIG. 5 schematically illustrates an enlarged plan view of a semiconductor device that includes a power controller in accordance with the present invention.

FIG. 5 schematically illustrates an enlarged plan view of a portion of an embodiment of a semiconductor device 90 that is formed on a semiconductor die 91. Controller 21 is formed on die 91. Die 91 may also include other circuits that are not shown in FIG. 5 for simplicity of the drawing. Controller 21 is formed on die 91 by semiconductor manufacturing techniques that are well known to those skilled in the art.

In view of all of the above, it is evident that a novel device and method is disclosed. Included, among other features, is forming a power controller to generate a set of drive pulses to a transistor that responsively forms a set of pulses of current having an asymmetrical envelope signal envelope. The asymmetrical envelope results in less audible noise and lower amplitude harmonics than other signal envelopes.

While the invention is described with specific preferred embodiments, it is evident that many alternatives and variations will be apparent to those skilled in the semiconductor arts. More specifically the invention has been described for a particular signal envelope control block embodiment and for particular connections to a PWM control section, although the method is directly applicable to other embodiments for generating the asymmetrical signal envelope.

The invention claimed is:

1. A method of forming a power system controller comprising:
    coupling a PWM controller to receive a reference signal having an asymmetrical waveform that increases continuously over a time interval that is greater than a switching cycle of a drive pulse formed by the PWM controller and responsively generate during the time interval a set of drive pulses having a plurality of drive pulses with increasing widths; and
    operably coupling the PWM controller to use the plurality of drive pulses during the time interval to control a power switch to form a plurality of current pulses having successively increasing amplitudes responsively to the increases in the reference signal wherein the successively increasing amplitudes form an asymmetrical signal envelope for the current pulses.

2. The method of claim 1 further including coupling a control block to generate the reference signal having the asymmetrical waveform responsively to a control signal representative of an output voltage increasing from a first value to a second value.

3. The method of claim 2 wherein coupling the control block to generate the reference signal includes coupling the control block to generate a triangular shaped reference signal.

4. The method of claim 3 wherein coupling the control block to generate the triangular shaped reference signal includes coupling the control block to generate the triangular shaped reference signal having a vertical cut-off.

5. The method of claim 1 wherein coupling the PWM controller to receive the reference signal includes coupling a comparator of the PWM controller to receive the asymmetrical reference signal.

6. The method of claim 1 wherein coupling the PWM controller to receive the reference signal includes coupling the PWM controller to receive the asymmetrical reference signal and responsively generate each drive pulse within the set with a width that is greater than a previous drive pulse within the set.

7. A method of forming a power supply controller comprising:
configuring the power supply controller to organize output drive pulses of the power supply controller into a plurality of sets with each set having a plurality of drive pulses wherein the plurality of sets are spaced apart in time;
configuring the power supply controller to form a reference signal having a value that varies continuously over a time interval that is greater than at least two drive pulse cycles of the plurality of drive pulses; and
configuring the power supply controller to form the plurality of drive pulses within at least one set during the time interval to have successively increasing pulse widths in order to generate successive current pulses that increase in amplitude and form an asymmetrical signal envelope for the successive current pulses wherein at least a portion of the asymmetrical signal envelop increases in amplitude responsively to the increase in the amplitude of the successive current pulses.

8. The method of claim 7 wherein configuring the power supply controller to form the plurality of drive pulses includes configuring the power supply controller to form the plurality of drive pulses within the at least one set to have widths suitable to generate an asymmetrical signal envelope for the current through a transistor that receives the plurality of drive pulses.

9. The method of claim 7 wherein configuring the power supply controller to form the plurality of drive pulses within the at least one set includes configuring the power supply controller to form the plurality of drive pulses to generate a triangle shaped signal envelope.

10. The method of claim 7 wherein configuring the power supply controller to form the plurality of drive pulses within the at least one set includes configuring the power supply controller to form each drive pulse of the plurality of drive pulses to have a width that is greater than an adjacent drive pulse.

11. The method of claim 7 wherein configuring the power supply controller to organize output drive pulses of the power supply controller into the plurality of sets includes configuring the power supply controller to space the plurality of sets apart in time by a time period of at least one drive pulse.

12. The method of claim 7 wherein configuring the power supply controller to organize output drive pulses of the power supply controller into the plurality of sets includes configuring the power supply controller to organize the output drive pulses into the plurality of sets responsively to a control signal representative of an output voltage increasing from a first value to a second value.

13. The method of claim 7 wherein configuring the power supply controller to form the plurality of drive pulses within the at least one set includes configuring the power supply controller to form an asymmetrical reference signal and to use the asymmetrical reference signal to control the pulse widths.

14. The method of claim 13 further including configuring the power supply controller to use an asymmetrical reference voltage.

15. A power controller semiconductor device comprising:
a control block coupled to generate an asymmetrical reference signal having a value that varies over a time interval wherein the time interval is greater than a switching cycle of the power controller; and
a PWM controller coupled to receive the asymmetrical reference signal and generate during the time interval a set of drive pulses that includes a plurality of drive pulses, the plurality drive pulses having widths that increase successively over the time interval wherein the PWM controller is configured to use the plurality of drive pulses to control a power switch to generate a current having an asymmetrical signal envelope that increases in amplitude responsively to all of the plurality of drive pulses.

16. The power controller semiconductor device of claim 15 wherein the control block coupled to generate the asymmetrical reference signal includes the control block coupled to generate the asymmetrical reference signal responsively to a control signal representative of an output voltage changing from a first value to a second value.

17. The power controller semiconductor device of claim 16 wherein the control block coupled to generate the asymmetrical reference signal includes the control block coupled to generate an asymmetrical reference voltage.

18. The method of claim 2 further including configuring the power system controller to form the reference signal to be representative of the control signal and to use the reference signal to control the power switch and regulate the output voltage to a desired value responsively to the control signal having a value that is less than the second value; and
configuring the control block to set the reference signal to a value at a beginning of a set of drive pulses that causes each drive pulse of the plurality of drive pulses that are formed during the set of drive pulses to have a width that is greater than an immediately preceding drive pulse of the plurality of drive pulses.

19. The method of claim 7 wherein configuring the power supply controller to form the reference signal having the value that varies continuously over the time interval includes configuring the power supply controller to form the reference signal to increase in value continuously over the time interval.

20. The power controller semiconductor device of claim 15 wherein the control block is configured to form the reference signal to increase in value continuously over the time interval.

* * * * *